United States Patent
McGrew et al.

(10) Patent No.: US 9,699,202 B2
(45) Date of Patent: Jul. 4, 2017

(54) INTRUSION DETECTION TO PREVENT IMPERSONATION ATTACKS IN COMPUTER NETWORKS

(71) Applicant: Cisco Technology, Inc., San Jose, CA (US)

(72) Inventors: David McGrew, Poolesville, MD (US); Titouan Rigoudy, Pittsburgh, PA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 14/717,127

(22) Filed: May 20, 2015

(65) Prior Publication Data

US 2016/0344768 A1 Nov. 24, 2016

(51) Int. Cl.
*H04L 29/06* (2006.01)

(52) U.S. Cl.
CPC ...... *H04L 63/1416* (2013.01); *H04L 63/1425* (2013.01); *H04L 63/1483* (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 2001/0032310 A1* | 10/2001 | Corella | ................... | H04L 9/002 713/156 |
| 2004/0006706 A1* | 1/2004 | Erlingsson | .............. | G06F 21/51 726/30 |
| 2004/0133672 A1* | 7/2004 | Bhattacharya | ...... | H04L 63/1416 709/224 |
| 2008/0207206 A1* | 8/2008 | Taniuchi | ............... | H04W 12/06 455/436 |
| 2009/0027195 A1* | 1/2009 | Cochran | ................. | G01W 1/04 340/541 |
| 2009/0164786 A1* | 6/2009 | Sekimoto | ........... | H04N 7/17318 713/171 |
| 2009/0240941 A1* | 9/2009 | Lee | ......................... | H04L 12/66 713/169 |
| 2009/0249445 A1* | 10/2009 | Deshpande | ....... | G06F 17/30887 726/3 |
| 2010/0049975 A1* | 2/2010 | Parno | ..................... | H04L 63/08 713/168 |

(Continued)

*Primary Examiner* — Farid Homayounmehr
*Assistant Examiner* — Zhimei Zhu
(74) *Attorney, Agent, or Firm* — Hickman Palermo Becker Bingham LLP

(57) ABSTRACT

In an embodiment, a central computer performs a data processing method. The central computer receives telemetry data from intrusion sensors. The central computer stores authentication records in a hosts database. Each authentication record is based on the telemetry data and comprises a thumbprint of a public key certificate and a host identifier of a sender computer. The central computer receives a suspect record that was sent by a first intrusion sensor. The suspect record has a first particular thumbprint of a first particular public key certificate and a first particular host identifier of a suspect sender. From the hosts database, the central computer searches for a matching record having a same host identifier as the first particular host identifier of the suspect record and a same thumbprint as the first particular thumbprint of the suspect record. The central computer generates an intrusion alert when no matching record is found.

19 Claims, 6 Drawing Sheets

(56) References Cited

U.S. PATENT DOCUMENTS

| | | | |
|---|---|---|---|
| 2010/0275024 A1* | 10/2010 | Abdulhayoglu | G06F 21/6218 713/175 |
| 2011/0113020 A1* | 5/2011 | Pulleyn | H04L 29/12047 707/696 |
| 2011/0141924 A1* | 6/2011 | Froehlich | H04L 41/0893 370/252 |
| 2013/0061281 A1* | 3/2013 | Pao | H04L 9/0891 726/1 |
| 2014/0075185 A1* | 3/2014 | Dragomir | H04L 9/3268 713/156 |
| 2014/0157394 A1* | 6/2014 | Koonjbearry | H04L 63/1483 726/10 |
| 2014/0283054 A1* | 9/2014 | Janjua | H04L 63/1408 726/23 |
| 2015/0236861 A1* | 8/2015 | Engberg | H04L 9/3268 713/156 |
| 2015/0350195 A1* | 12/2015 | Vangara | H04L 63/0823 726/10 |
| 2016/0142314 A1* | 5/2016 | Parsa | H04L 45/7453 370/235 |
| 2016/0255105 A1* | 9/2016 | Palazzo | H04L 63/1425 |

* cited by examiner

INTRUSION DETECTION TO PREVENT IMPERSONATION ATTACKS IN COMPUTER NETWORKS

TECHNICAL FIELD

The present disclosure relates to computer technology for improved protection of computer networks and network elements in computer networks using an intrusion prevention method that involves central authentication of public key certificate data.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The computers of an enterprise may consume remote resources, such as web services. A remote resource may reside on the premises of the enterprise, be hosted by a partner, or offered to the public by a third party. The integrity and authenticity of a remote resource may be ensured by a public key digital certificate that is offered by a remote computer, such as a web server, that serves the remote resource. A remote server may use a digital certificate to provide transport security or message security. Digital signing achieves message security by affixing a certificate directly to a payload object being sent from a remote server to a client. Transport security is achieved when establishing a connection between a client and a remote server is accompanied by a certificate, such that all objects exchanged over the connection derive security from the behavior of the connection. Regardless of whether a certificate is used to provide message or transport security, the remote server presents the certificate to the client for inspection. A malicious, impersonating, or compromised remote server may present a bad certificate that is fake, tampered, or otherwise deceptive. A bad certificate can enable theft, sabotage, or fraud, such as a man in the middle (MitM) attack.

Authenticity may be enhanced if a certificate is signed by a trustworthy third party such as a certificate authority (CA). However, agreement between client and server may be lacking as to which certificate authorities are trustworthy. To work around this problem, some systems use certificates that are not authenticated by a CA, such as self-signed certificates. These systems require a user to manually approve each certificate the first time that it is received, such as through a click-to-accept mechanism that provides a user with some information about a certificate and then remembers whether the user accepted the certificate as trustworthy. Remembrance of a certificate by a client is known as certificate pinning Pinning burdens an end user with assessing the trustworthiness of a certificate, which may be unreliable.

Certificates may be scrutinized by a public system, such as a certificate reputation system, which can achieve better authentication than pinning A certificate reputation system is intrusive because a client application must be adapted to use the certificate reputation system. Because a certificate reputation system is typically operated by another institution and expects to harvest connectivity data, a certificate reputation system is inappropriate for a sensitive private network. The unsuitability of a certificate reputation system may also be technical, due to obstacles such as a firewall. Because a certificate reputation system relies on crowd sourced data, another limitation of a certificate reputation system is that an attacker may pollute the reputation database with false information.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Process Overview
4.0 Distributed Intrusion Sensors and a Localized Attack
5.0 Centrally Orchestrated Active Monitoring
6.0 Analytics
7.0 Hardware Overview
8.0 Extensions and Alternatives 1.0 General Overview In an embodiment, a data processing method is performed by a central computer. The central computer receives telemetry data from intrusion sensors. The central computer stores authentication records in a hosts database. Each authentication record is based on the telemetry data and comprises a thumbprint of a public key certificate and a host identifier of a sender computer. The central computer receives a suspect record that was sent by a first intrusion sensor. The suspect record has a first particular thumbprint of a first particular public key certificate and a first particular host identifier of a suspect sender. From the hosts database, the central computer selects a matching record having a same host identifier as the first particular host identifier of the suspect record and a same thumbprint as the first particular thumbprint of the suspect record. The central computer generates an intrusion alert when no matching record is found.

In an embodiment, a device includes a hosts database that stores the authentication records, a processor, and processor logic that causes the device to perform the steps of the method described above.

In an embodiment, non-transitory computer-readable storage media store instructions which, when executed by a plurality of processors, causes performance of the steps of the method described above.

2.0 Structural and Functional Overview

Figure 1:
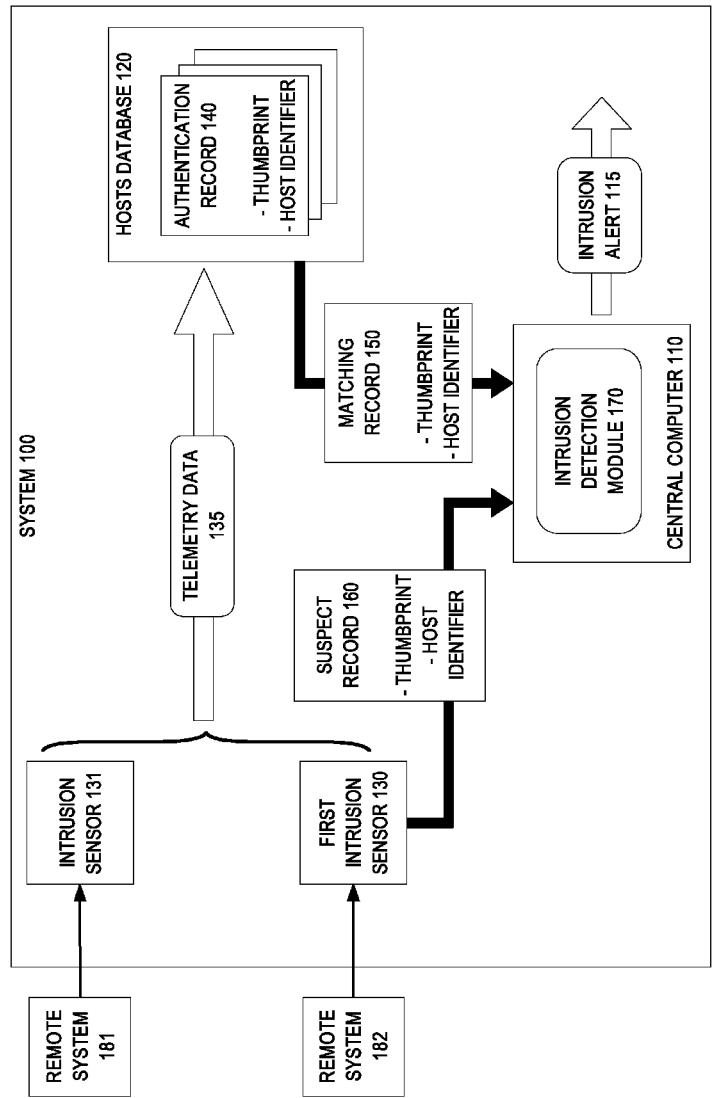
FIG. 1 illustrates an embodiment of an intrusion prevention system that detects and prevents an impersonation attack.

FIG. 1 illustrates an embodiment of intrusion prevention system 100 that prevents an impersonation attack.

In an embodiment, an intrusion prevention system 100 comprises one or more intrusion sensors 130-131, a hosts database (DB) 120, and a central computer 110. Central computer 110 may be any computerized system that is networked and capable of exchanging and processing records. Central computer 110 may be a rack server, a personal computer, some other computer, or some aggregation of these.

Hosts DB 120 may be a file system, a database management system, or other computerized system that persistently stores and organizes electronic records. Hosts DB 120 may reside on central computer 110 or another networked and computerized system that communicates with central computer 110. Hosts DB 120 is configured to store many authentication records, such as authentication record 140 and matching record 150. At least one of hosts DB 120 or central computer 110 is configured to implement a search module that is configured to receive and respond to a query for a search of the authentication records of hosts DB 120 to select matching record 150 that matches search criteria.

Each of intrusion sensors 130-131 is an intrusion detection system (IDS) that may include a network appliance or other networked and computerized system. Intrusion sensors 130-131 communicate with central computer 110. The central computer 110 is configured with one or more ingress interfaces that may be coupled to network links that reach the intrusion sensors 130, 131 to permit receiving messages or reports from the intrusion sensors 130, 131.

Central computer 110 may host or execute an intrusion detection module 170 that is configured to perform the intrusion detection functions that are more fully described herein. In various embodiments, the intrusion detection module 170 may be implemented using one or more computer programs, other software elements, firmware, hardware logic such as FPGAs or ASICs, or any combination of the foregoing. The specific implementation for intrusion detection module 170 is not critical.

For purposes of illustrating a clear example, FIG. 1 shows a limited number of functional elements as previously described. In other embodiments, any number of intrusion sensors may be provided, and the central computer and hosts database may be implemented as multiple clustered or distributed instances, using digital hardware at a particular premises or using virtual machine instances in a private or public datacenter or cloud computing facility.

Operations of the system 100 are now described and the functional descriptions herein may be regarded as functional specifications and/or design specifications that can be used to program one or more computers or configure one or more computers with logic that implements the functions that are described. In operation, intrusion sensors 130-131 monitor computer network traffic coming from remote servers, such as remote servers 181-182. Intrusion sensors 130-131 also inspect any public key certificates that are included within the network traffic. Intrusion sensors 130-131 report information about these certificates, termed telemetry data 135. Although telemetry data 135 is shown as coming substantially only from intrusion sensors 130-131 for purposes of illustrating a clear example, in practice many intrusion sensors may contribute telemetry data 135.

Telemetry data 135 is used to generate authentication records, such as authentication record 140 or matching record 150, which are stored in hosts DB 120. These authentication records may be generated by central computer 110, intrusion detection module 170, hosts database 120, or may already exist with telemetry data 135. Each authentication record typically corresponds to a particular certificate presented by a particular remote server. A one to one correspondence usually occurs between a certificate and a remote server, but a remote server may have multiple certificates, and a certificate may be shared by several remote servers.

Each authentication record may include a thumbprint of a certificate and a host identifier of the remote server that presented the certificate. A host identifier may be a qualified hostname, an internet protocol (IP) address, or any other datum that uniquely identifies a host. A thumbprint is a hash code that is smaller than a certificate, derived from the certificate, and usually as unique as the certificate. A certificate is guaranteed to be unique. Very rarely will two certificates share a thumbprint, but an implementation may ignore this in practice. Embodiments also may be configured to track whole certificates, rather than thumbprints, as further described herein.

First intrusion sensor 130 may detect the use of a particular certificate of a remote server. First intrusion sensor 130 may be configured to report certificate usage, unconditionally or conditionally, and/or according to criteria or analysis. First intrusion sensor 130 reports the certificate usage by generating suspect record 160. Suspect record 160 includes a thumbprint of the certificate and a host identifier of the remote server that presented the certificate. Suspect records, such as suspect record 160, may be transferred to central computer 110 either individually or in bulk. Although central computer 110 is shown as receiving only one suspect record from one intrusion sensor, in practice many intrusion sensors may generate and send suspect records to central computer 110. Although suspect record 160 and telemetry data 135 are shown as separate data, in practice the same data may serve both purposes.

Central computer 110 is configured to attempt to match suspect record 160 by selecting an authentication record stored in hosts DB 120. A match occurs when a stored authentication record has the same thumbprint and host identifier as suspect record 160 has. "Same," in this context, may mean exactly the same, or may mean a fuzzy or partial match. The occurrence of a match depends on the existence of matching record 150 that can be selected by central computer 110.

Central computer 110 may be configured to treat the occurrence of a match as routine, unthreatening, and therefore uninteresting. If central computer 110 cannot match suspect record 160 with any authentication record stored in hosts DB 120, then no matching record 150 is found. Central computer 110 is configured to react to the absence of a match by generating intrusion alert 115. Central computer 110 may log or otherwise raise intrusion alert 115.

3.0 Process Overview

Figure 2:
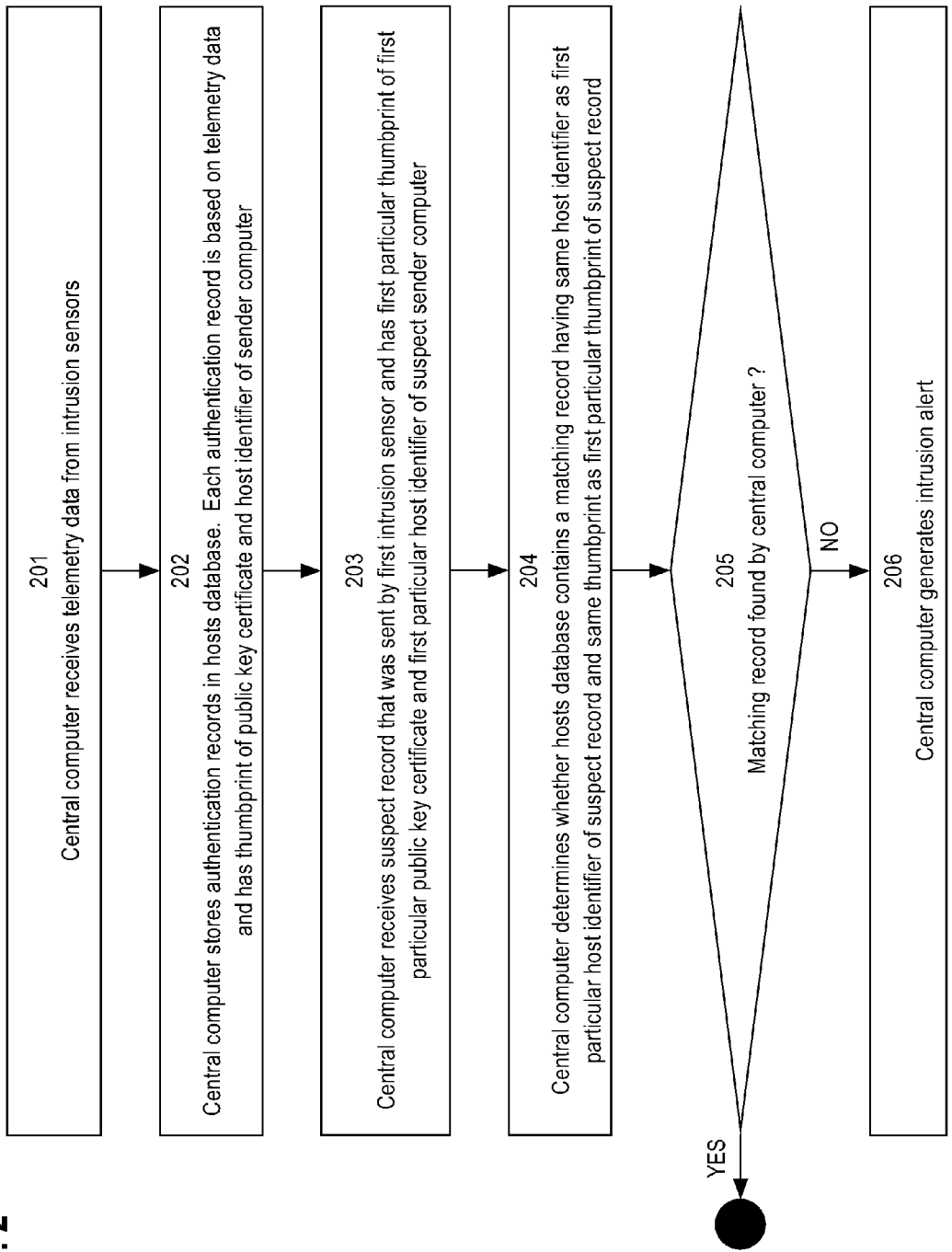
FIG. 2 illustrates an embodiment of a process that detects and prevents an impersonation attack.

FIG. 2 illustrates a process that prevents an impersonation attack, in an example embodiment. For purposes of illustrating a clear example, FIG. 2 may be described with reference to FIG. 1, but using the particular arrangements illustrated in FIG. 1 is not required in other embodiments.

In step 201, a central computer receives telemetry data from many intrusion sensors. For example, each of intrusion sensors 130-131 monitors the traffic of a computer network within an enterprise. Intrusion sensors 130-131 may observe and record inbound and outbound connection attempts between a computer on the computer network and a remote server. The remote server need not reside on the computer network. Intrusion sensors 130-131 may observe and record a usage of a public key certificate and other data exchanged during or after connection establishment. Intrusion sensors 130-131 transmit this observation as telemetry data 135 to central computer 110.

In step 202, the central computer stores authentication records in a hosts database. For example, central computer 110 may store telemetry data 135 in hosts database 120 as authentication records such as authentication record 140. Each authentication record includes a thumbprint of a certificate and a host identifier of a remote server that presented the certificate. Hosts database 120 may function as a repository of secure network connections that intrusion prevention system 100 has observed in the past. A future observation of a secure network connection that does not agree with the records of hosts database 120 might constitute an impersonation attack.

In step 203, the central computer receives a suspect record that was sent by an intrusion sensor. For example, first intrusion sensor 130 may observe a usage of a public key certificate by a remote server. Perhaps according to screening criteria designed to detect suspicious activity, perhaps unconditionally, or perhaps randomly, first intrusion sensor 130 decides to report this usage of the public key certificate. First intrusion sensor 130 reports this usage by sending suspect record 160 to central computer 110 for central authentication. Suspect record 160 has a host identifier of the remote server and a copy of the public key certificate or at least a thumbprint of the certificate. First intrusion sensor 130 may generate the thumbprint, or the remote server may send the thumbprint with the public key certificate.

In step 204, the central computer attempts to select from the hosts database an authentication record that matches the suspect record. For example, central computer 110 may use the thumbprint and host identifier of suspect record 160 as matching criteria. Central computer 110 may use the matching criteria to search hosts database 120 for a record that matches, such as matching record 150.

In step 205, the central computer decides whether an authentication record is found that matches the suspect record. If a match is found, then central computer 110 may conclude that suspect record 160 regards a certificate usage that fits an historical usage pattern and does not indicate an impersonation attack. Upon finding such a match, central computer 110 need not engage in any further activity. Central computer 110 may optionally update hosts database 120 or matching record 150 if an accumulation of additional history is desired for another purpose.

In step 206, the central computer generates an intrusion alert. For example, if central computer 110 discovers that no authentication record exists that matches suspect record 160, then central computer 110 may decide that an impersonation attack is in progress or has already occurred. In the absence of a matching record, central computer 110 is configured to generate an intrusion alert. The alert may trigger a manual or an automatic security response. The alert may be propagated back to some or all intrusion sensors, which may cause a security ban of all network traffic that involves the offending public key certificate or involves the offending remote server.

4.0 Distributed Intrusion Sensors and a Localized Attack

Figure 3:
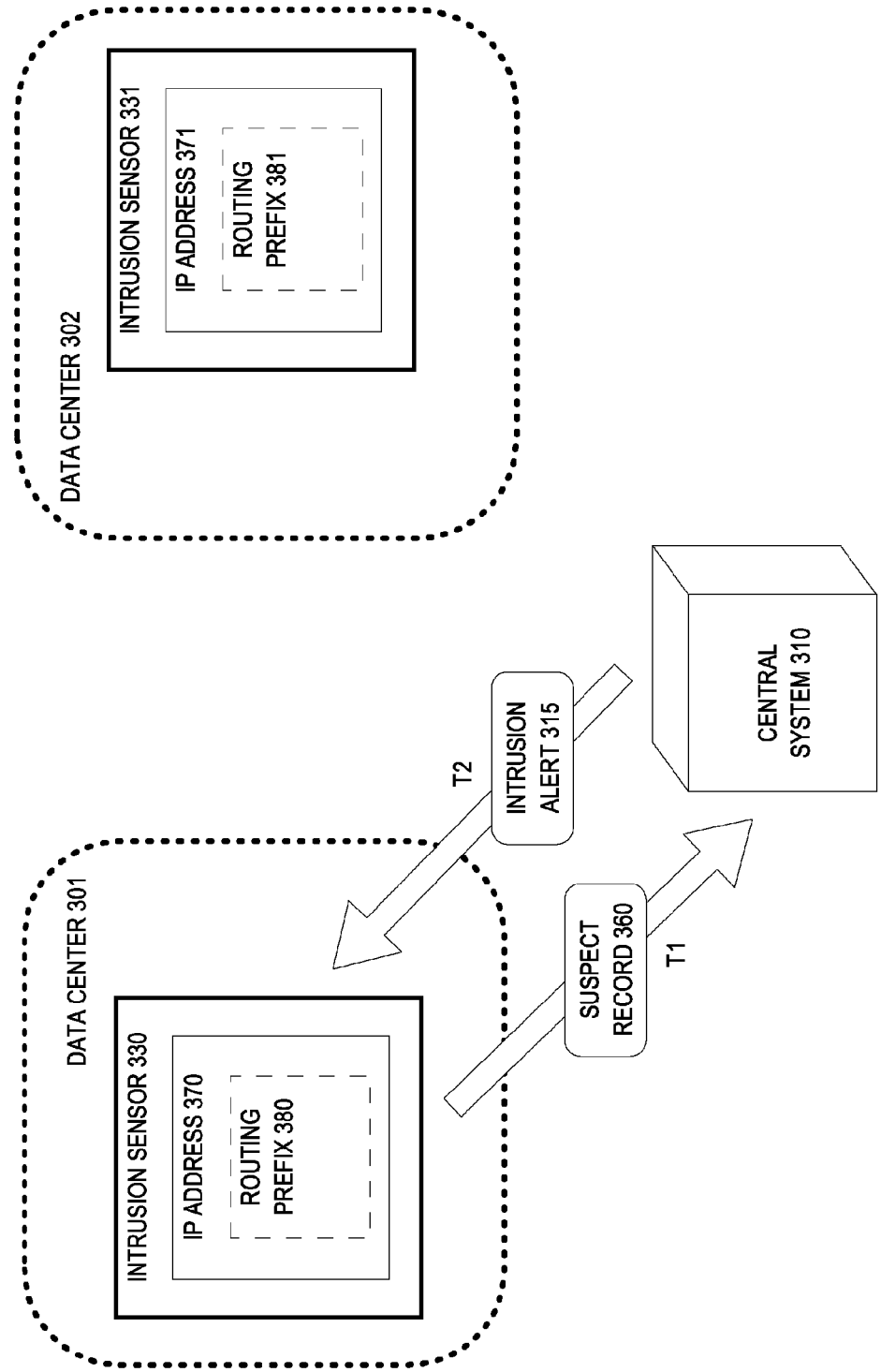
FIG. 3 illustrates an embodiment of an intrusion prevention system that detects and prevents an impersonation attack.

FIG. 3 illustrates an embodiment of intrusion prevention system 300 that uses distributed intrusion sensors to detect a localized attack. A "localized attack," in this context, may occur when a malicious server impersonates a valid server. This manifests as two remote servers proclaiming to be the same server by using the same host identifier. A localized attack is limited to a portion of an internetworked topology, such that a symptom of the attack is observable in one network portion but not another portion. Whether the attack is observable depends on the vantage point of the observer within the topology. A consequence is that reports by distributed intrusion sensors might not agree, and such a discrepancy indicates a localized attack.

Intrusion prevention system 300 exemplifies a deployment by a large enterprise or corporation having multiple data centers. Intrusion prevention system 300 may be an implementation of intrusion prevention system 100. Intrusion prevention system 300 comprises central system 310 and data centers 301-302. Each of data centers 301-302 respectively includes intrusion sensors 330-331.

Central system 310 may be an implementation of central computer 110 (FIG. 1). Intrusion sensors 330-331 may be implementations of intrusion sensors 130-131. Components of FIG. 1 that are implemented in FIG. 3 may also have other implementations. Communication between components of intrusion prevention system 300 may occur over the global Internet.

Although intrusion prevention system 300 implements substantially all of the features of intrusion prevention system 100, not all of the essential components and interactions of FIG. 1 are shown in FIG. 3. Instead, FIG. 3 shows only those components and interactions that demonstrate custom features of intrusion prevention system 300. For example, hosts DB 120 is absent from FIG. 3 although this component is typically still included in intrusion prevention system 300.

To achieve different vantage points, intrusion sensors 330-331 typically reside on different local area networks that are physically separated from each other by at least one router. In this example intrusion sensors 330-331 are shown as residing in separate data centers, however such extreme separation is not required. For example, intrusion sensors 330-331 may share an Internet point of presence, and instead achieve separation using different subnets.

Intrusion sensors 330-331 are separate hosts and so have different respective IP addresses 370-371. However, because intrusion sensors 330-331 are topologically separated by residing on separate local area networks, IP addresses 370-371 exhibit substantial differences. The highest order bits are different between IP addresses 370-371. The amount of these highest order bits may be fixed, such as a 24-bit IP version 4 network prefix. The highest order bits may instead be a subnet number. In this example the highest order bits are routing prefixes 380-381, which are classless inter-domain routing (CIDR) prefixes. As such, each of routing prefixes 380-381 may have a different amount of bits.

In this example, a localized attack affects data center 301. This may happen if a host within data center 301 is compromised. Alternatively, a routing table of an upstream or backbone router may be compromised, although that router is not within either of data centers 301-302. Because of the hierarchical nature of the topology of an internetwork such as the global Internet, the localized attack need not originate from directly inside data center 301. For the attack to be localized, the attacker may reside on the same routing subdivision of an internetwork as data center 301, which is a different routing subdivision than data center 302. For example, if data centers 301-302 are on separate continents, then an attack from within one of those continents may manifest as a localized attack.

No matter how the attack is accomplished and because it is localized, intrusion sensors 330-331 may observe different certificates presented by supposedly one remote server. Intrusion sensor 330 may or may not consider as suspicious a certificate it observes that happens to be bad. However according to some criteria and at time T1, intrusion sensor 330 decides to send suspect record 360 to report the usage of the certificate by the remote server.

Upon receipt of suspect record 360, central system 310 attempts to select a matching record, having the same thumbprint and host identifier as suspect record 360, from among the authentication records stored in the hosts DB. Other intrusion sensors, such as intrusion sensor 331, have previously and presently observed a good certificate used by that remote host, and the hosts DB has an authentication record that indicates that the good certificate is associated with the remote host. The attempt by central system 310 to select a matching record for suspect record 360 fails because the thumbprint of the bad certificate in suspect record 360 does not match the stored authentication record of the same remote host. Unable to find a matching record, central system 310 determines that suspect record 360 indicates an attack. In response to detecting the localized attack and at time T2, central system 310 sends intrusion alert 315 to intrusion sensor 330. Although not shown, intrusion alert 315 includes the host identifier of the remote server. Upon receiving and processing intrusion alert 315, intrusion sensor 330 determines that a threat is associated with that host identifier. Intrusion sensor 330 may then protect data center 301 by banning traffic that uses that host identifier. The other data center 302 is not affected by the localized attack and continues to allow traffic that uses the host identifier.

5.0 Centrally Orchestrated Active Monitoring

Figure 4:
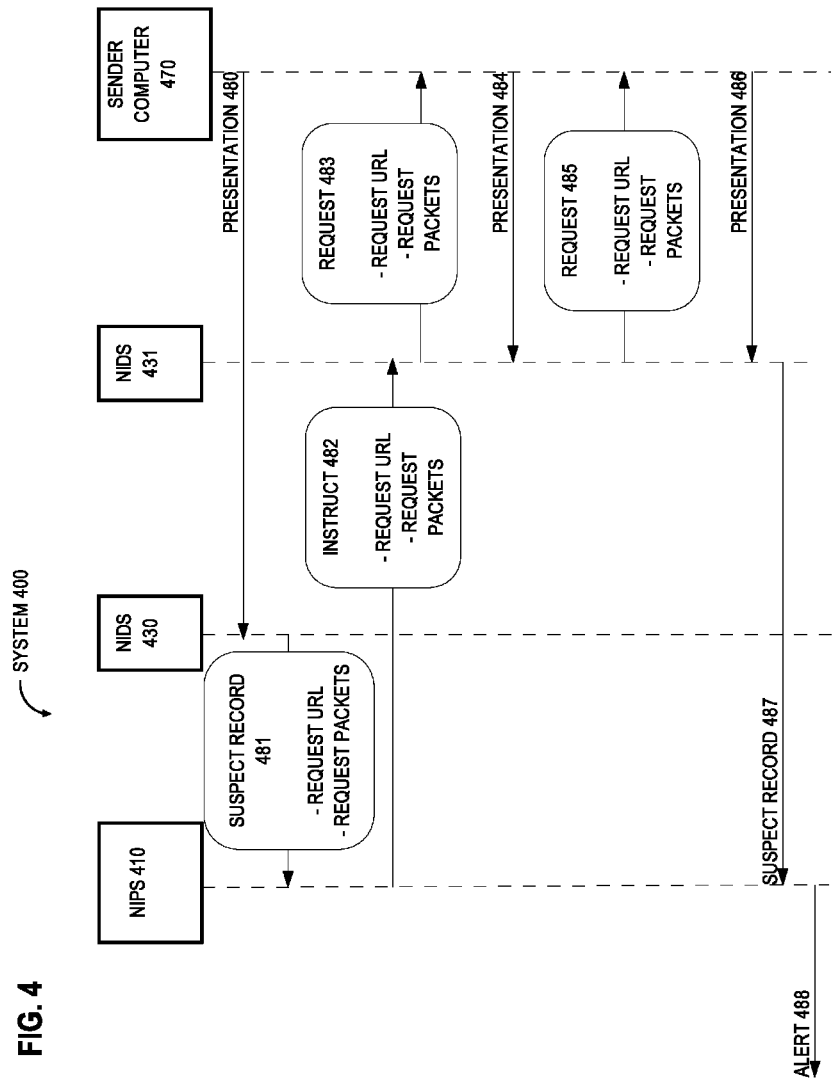
FIG. 4 illustrates an embodiment of interactions that detect and prevent an impersonation attack.

FIG. 4 illustrates an embodiment of internetwork system 400 that centrally orchestrates ongoing active monitoring. Internetwork system 400 may be, for example, a deployment by a large institution having multiple local networks. Internetwork system 400 may be an implementation of intrusion prevention system 100. Internetwork system 400 comprises network-based intrusion protection system (NIPS) 410, network intrusion detection systems (NIDS) 430-431, and sender computer 470.

Sender computer 470 may be any networked computer configured to present a certificate and operate as a remote server. NIPS 410 may be an implementation of central computer 110. NIDS 430-431 may be implementations of intrusion sensors 130-131. Components of FIG. 1 that are implemented in FIG. 4 may also have other implementations. Communication between components of internetwork system 400 may occur over the global Internet.

Although internetwork system 400 implements substantially all of the features of intrusion prevention system 100, not all of the essential components and interactions of FIG. 1 are shown in FIG. 4. Instead, FIG. 4 shows only those components and interactions that demonstrate custom features of internetwork system 400. For example, hosts DB 120 is absent from FIG. 4 although this component is still typically included in internetwork system 400.

NIPS 410 is configured to actively search for an attack by overseeing some operation of NIDS 430-431. For example, NIDS 430 may detect the usage of a certificate that sender computer 470 presents during presentation 480.

According to some criteria, NIDS 430 decides to send suspect record 481 to report the usage of the certificate. Depending on the implementation, suspect record 481 may include a request URL or request packets, either of which was used to cause sender computer 470 to send its certificate. For example and although not shown, a laptop computer may share a local area network with NIDS 430. The laptop may have used some IP packets to retrieve a digitally signed object that sender computer 470 digitally signs by affixing its certificate and then delivers to the laptop during presentation 480. NIDS 430 may record those request packets and then during presentation 480, NIDS 430 may send suspect record 481 that includes copies of both the request packets and the certificate.

After receiving suspect record 481, NIPS 410 may process suspect record 481 in a variety of ways. For example, NIPS 410 may insert or update a record in a hosts DB to indicate an association between the host identifier and the certificate of sender computer 470. NIPS 410 may also store the request URL or request packets of suspect record 481 into the hosts DB for later analysis or replay. NIPS 410 may eventually decide to check for a local attack in progress by seeking corroboration of suspect record 481 by another NIDS. For example, NIPS 410 may send a copy of the request URL or request packets in instruct 482 that instructs another NIDS 431 to replay the request data.

Replay entails a NIDS repeating a prior request of any computer to solicit a same certificate that sender computer 470 presented in response to an original request. Replaying a request URL with a minimal hypertext transfer protocol (HTTP) GET verb is straightforward. A more involved replay is one that has data in addition to an URL, such as common gateway interface (CGI) form data. When replay data is needed, replay should be based on request packets of the original request. Packets may need some alteration during replay. For example and in response to instruct 482, NIDS 431 may adjust a sender address, a send time, and a cryptographic nonce of packets included in repeated request 483 resent to sender computer 470. Upon receipt of repeated request 483, sender computer 470 may respond by again presenting its certificate during presentation 484.

Instruct 482 may optionally instruct NIDS 431 to periodically repeat a replay, such as during periodic request 485. If sender computer has become impersonated since instruct 482 and upon receipt of periodic request 485, impersonating sender computer 470 may respond during presentation 486 by presenting a different certificate than previously presented by authentic sender computer 470. At some time and according to some criteria, NIDS 431 may decide to report the details of presentation 486 by sending suspect record 487 to NIPS 410. Upon receipt of suspect record 487, NIPS 410 detects an attack because NIPS 410 fails to find an authentication record in the hosts DB that matches the thumbprint and host identifier of suspect record 487.

Altering request packets during replay is not the only example of sophisticated replay. Sender computer 470 may initially interact without security and without presenting a certificate. For example and although not shown, presentation of a certificate might not occur until the middle of a session, such as when sender computer 470 proposes mid-session that a connection should be upgraded to secure sockets layer (SSL) but continue to use the same port number.

For example, sender computer 470 may send a mid-session response that includes the start transport layer security (STARTTLS) keyword. Sending the STARTTLS keyword by sender computer 470 initiates additional steps. The client may accept the proposal to achieve security by sending a request that repeats the STARTTLS keyword. Upon receipt of that request, sender computer 470 may present its certificate. An unsophisticated NIDS might be configured only to monitor connection establishment and then ignore subsequent traffic on that connection. A sophisticated NIDS may be configured to detect a use of STARTTLS long after connection establishment, observe an involved certificate, and send a suspect record to NIPS 410 that specifies the request that included the STARTTLS keyword, rather than the request that established the connection to sender computer 470. A NIDS may also be configured to replay a STARTTLS scenario by replaying the request that included the STARTTLS keyword.

6.0 Analytics

Figure 5:
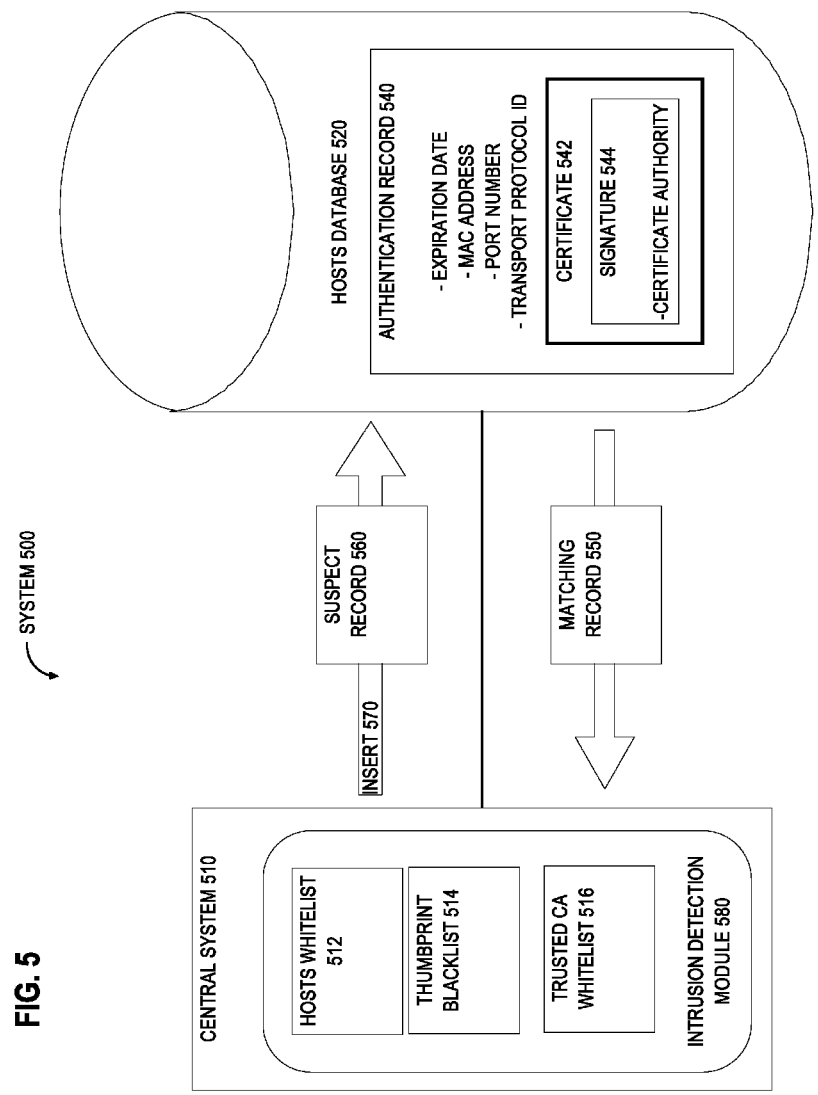
FIG. 5 illustrates an embodiment of an intrusion prevention system that detects and prevents an impersonation attack.

FIG. 5 illustrates an embodiment of intrusion prevention system 500 that uses analytics to detect an impersonation attack. Intrusion prevention system 500 exemplifies an architecture with rich data. Intrusion prevention system 500 may be an implementation of intrusion prevention system 100. Intrusion prevention system 500 comprises central system 510 and hosts DB 520.

Central system 510 may be an implementation of central computer 110. Hosts DB 520 may be an implementation of hosts DB 120. Components of FIG. 1 that are implemented in FIG. 5 may also have other implementations. Communication between components of intrusion prevention system 500 may occur over an internetwork.

Although intrusion prevention system 500 implements all of the features of intrusion prevention system 100, not all of the essential components and interactions of FIG. 1 are shown in FIG. 5. Instead, FIG. 5 shows only those components and interactions that demonstrate custom features of intrusion prevention system 500. For example, intrusion sensors 130-131 are absent from FIG. 5 although these components are still typically included in intrusion prevention system 500.

Hosts DB 520 may store rich data having many details of certificate usage that may be included in authentication records, such as authentication record 540. Although not shown, rich details in authentication record 540 are also present in suspect record 560. Central system 510 includes intrusion detection module 580 that alerts when no matching record 550 is found in hosts DB 520 according to details of suspect record 560. Intrusion detection module 580 may be an implementation of intrusion detection module 170, although intrusion detection module 170 may have other implementations.

Rich details in authentication records and suspect record 560 may be used as matching criteria while searching for matching record 550. Intrusion prevention system 500 may be configured to regard a thumbprint and host identifier as necessary but insufficient criteria while searching for matching record 550.

Authentication record 540 may have details of a network connection through which a certificate was presented, such as details that may appear in a connection URL. Authentication record 540 may have an identifier of a transport protocol of a connection, such as file transfer protocol (FTP) or internet message access protocol (IMAP). Authentication record 540 may have a port number. Central system 510 may detect usage of a transport protocol or port number not previously associated with a certificate or a remote server, for which intrusion detection module 580 may generate an alert.

Authentication record 540 may have a media access control (MAC) address of a network adapter of a remote server that presented a certificate. Intrusion detection module 580 may detect usage of an unfamiliar MAC address by a familiar remote server, for which intrusion detection module 580 may generate an alert.

Authentication record 540 may have an expiration date of a certificate. Intrusion detection module 580 may use a certificate expiration date to detect a variety of conditions. Intrusion detection module 580 may process a certificate expiration date to detect and alert a premature certificate renewal. Premature renewal may occur when suspect record 560 mostly matches authentication record 540, but the expiration date of authentication record 540 is months or years in the future, and the expiration date of suspect record 560 is even later. Central system may process a certificate expiration date to detect and alert premature expiration, as when suspect record 560 mostly matches authentication record 540 but the expiration date of suspect record 560 is before the expiration date of authentication record 540. Intrusion detection module 580 may generate an alert based on an expired certificate.

Intrusion detection module 580 may have a grace period for which it will not alert an expired certificate. Although certificate renewal creates a new thumbprint, central system may be configured not to alert a certificate renewal that has old and new expiration dates that seem valid. If intrusion detection module 580 detects sufficient indicia of trustworthiness, intrusion detection module 580 may accommodate new or replacement certificates or remote servers by automatically inserting into hosts DB 520 an authentication record that corresponds to suspect record 560, shown as insert 570.

Intrusion detection module 580 may have matching criteria that it applies while searching for matching record 550. If suspect record 560 bears indicia of trustworthiness, then central system may relax the criteria used to find matching record 550. Likewise, if suspect record 560 lacks indicia of trustworthiness, then central system may heighten the criteria used to find matching record 550. For example, a domain certificate may be presented by any remote server of an Internet domain, and intrusion detection module 580 may keep and match authentication records only for domain certificates of certain domains or may allow a partial match of host identifier based solely on domain name. Alerting may be conditionally suppressed according to the trustworthiness of suspect record 560. For example, when no matching record 550 is found, generation of an alert may be suppressed if a certificate is self-signed by a remote server in a trusted Internet domain.

Rich data in suspect record 560 and authentication record 540 allows for more varied criteria of matching or alerting. Instead of merely having a thumbprint, authentication record 540 may have a whole certificate 542 or at least a whole public key of a certificate, either of which may be used as matching criteria when searching for matching record 550. Certificate 542 has signature 544 of a certificate authority that issued certificate 542. Intrusion detection module 580 may be configured with heightened matching criteria or relaxed alerting criteria if signature 544 is of a certificate authority that is untrusted. Intrusion detection module 580 may be configured with relaxed matching criteria or heightened alerting criteria if signature 544 is of a certificate authority that is trusted.

Intrusion detection module 580 may process security lists when deciding whether to alert suspect record 560. These security lists may be stored in central system 510, hosts DB 520, or elsewhere. Intrusion detection module 580 may check whether a host identifier of suspect record 560 occurs in hosts whitelist 512 and, if so, then apply relaxed matching or heightened alerting criteria.

Intrusion detection module 580 may check whether a thumbprint of suspect record 560 occurs in thumbprint blacklist 514 and, if so, then apply heightened matching or relaxed alerting criteria, such as unconditional alerting. Intrusion prevention system 500 may obtain thumbprint blacklist 514 from another institution. In addition to applying its own criteria when scrutinizing suspect record 560, intrusion detection module 580 may use a certificate reputation service of another institution to submit suspect record 560 to additional scrutiny. A certificate revocation list may serve as, or in addition to, thumbprint blacklist 514.

Intrusion detection module 580 may check whether a certificate authority signature of suspect record 560 occurs in trusted certificate authority (CA) whitelist 516 and, if so, then apply heightened matching or relaxed alerting criteria, such as alert silencing. Intrusion prevention system 500 may obtain trusted CA whitelist 516 from another institution. A root CA may delegate signing authority to intermediate CA. Such delegations may be stacked into a trust chain. Trusted CA whitelist 516 may have root and intermediate CAs. Intrusion detection module 580 may check trusted CA whitelist 516 for some or all CAs in a trust chain of a certificate.

7.0 Hardware Overview

Figure 6:
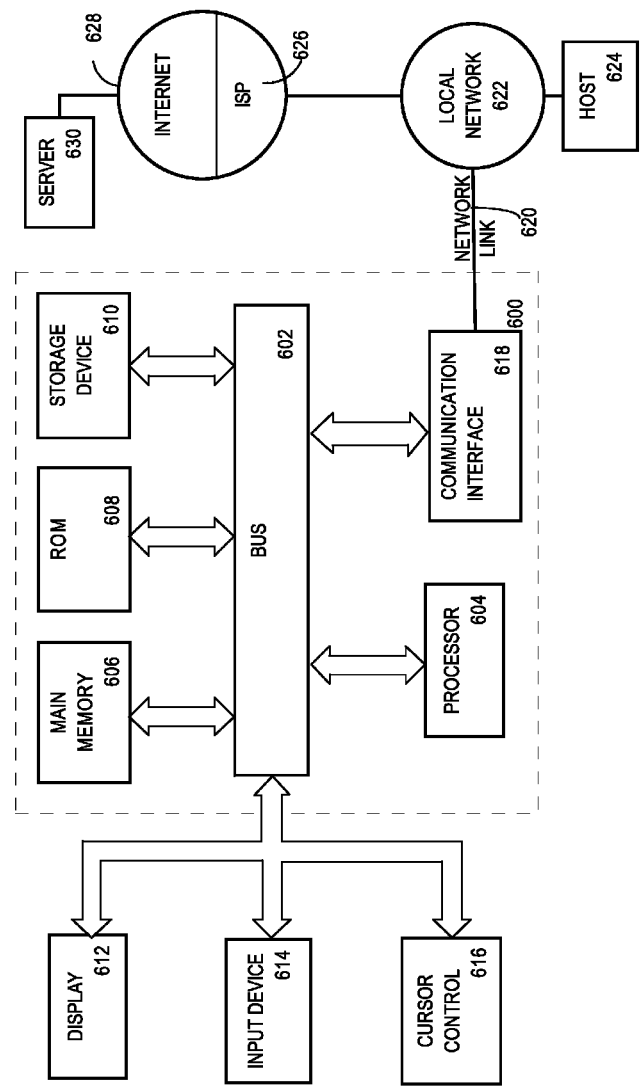
FIG. 6 illustrates a computer system upon which an embodiment may be implemented.

FIG. 6 is a block diagram that illustrates a computer system 600 upon which an embodiment of the invention may be implemented. The preferred embodiment is implemented using one or more computer programs running on at least one server computer, such as a blade server. Thus, in this embodiment, the computer system 600 is a blade server in a Beowulf cluster.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

According to one embodiment, compliance management is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 604 for execution. Such a medium may take many forms, including but not limited to, non-transitory and non-volatile storage media and non-transitory volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for compliance management as described herein. The received code may be executed by processor 604 as it is received, and/or stored in storage device 610, or other non-volatile storage for later execution.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A data processing method comprising:
a central computer receiving telemetry data from a plurality of intrusion sensors;
the central computer storing authentication records in a hosts database, wherein each authentication record is based on the telemetry data and comprises a thumbprint of a public key certificate and a host identifier of a sender computer;
the central computer receiving a suspect record that was sent by a first intrusion sensor and comprising a first particular thumbprint of a first particular public key certificate and a first particular host identifier of a suspect sender computer;
the central computer determining whether the hosts database contains a matching record having a same host identifier as the first particular host identifier of the suspect record and a same thumbprint as the first particular thumbprint of the suspect record;
the central computer instructing a second intrusion sensor to request a second particular public key certificate from the suspect sender computer of the suspect record; and
the central computer generating an intrusion alert when no matching record is found.

2. The method of claim 1 wherein the plurality of intrusion sensors comprises two intrusion sensors that are assigned internet protocol (IP) addresses that differ by at least one of: routing prefix, network prefix, and subnet number.

3. The method of claim 1 wherein the instructing comprises the central computer instructing the second intrusion sensor to periodically request the second particular public key certificate from the suspect sender computer of the suspect record.

4. The method of claim 1 wherein each authentication record optionally comprises a request uniform resource locator (URL) to which the suspect sender computer of the authentication record previously responded, and wherein the instructing comprises the central computer transferring the request URL to the second intrusion sensor.

5. The method of claim 1 wherein each authentication record comprises a plurality of request packets to which the suspect sender computer of the authentication record previously responded, and wherein the instructing comprises the central computer transferring the plurality of request packets to the second intrusion sensor.

6. The method of claim 1 wherein generating the intrusion alert comprises the central computer generating the intrusion alert only if a training period has finished.

7. The method of claim 1 wherein generating the intrusion alert comprises the central computer generating the intrusion alert only if the central computer determines that a hosts whitelist does not contain the first particular host identifier of the suspect sender computer.

8. The method of claim 1 wherein each authentication record comprises an expiration date value, wherein the suspect record comprises an expiration date value, wherein the matching record has a same expiration date value as the suspect record.

9. The method of claim 1 wherein each authentication record optionally comprises a media access control (MAC) address of the suspect sender computer of the authentication record, wherein the suspect record comprises a MAC address of the suspect sender computer, and wherein the matching record has a same MAC address as the suspect sender computer.

10. The method of claim 1 wherein each authentication record optionally comprises a port number that the suspect sender computer of the authentication record listened on, wherein the suspect record comprises a port number that the suspect sender computer listened on, and wherein the matching record has a same port number as the suspect record.

11. The method of claim 1 wherein each authentication record optionally comprises a transport protocol identifier that the suspect sender computer of the authentication record used, wherein the suspect record comprises transport protocol identifier that the suspect sender computer used, and wherein the matching record has a same transport protocol identifier as the suspect record.

12. The method of claim 1 further comprising the central computer generating an intrusion alert if the central computer determines that a thumbprint blacklist contains the first particular thumbprint of the suspect record.

13. The method of claim 1 wherein the first particular thumbprint of the suspect record is of a public key certificate that is not signed by a trusted certificate authority.

14. The method of claim 1 wherein each authentication record comprises a public key certificate of the suspect sender computer of the authentication record, wherein the suspect record comprises the first particular public key certificate of the suspect sender computer, and wherein the matching record has a same public key certificate as the suspect sender computer.

15. The method of claim 1 wherein generating the intrusion alert comprises the central computer inserting into the hosts database an authentication record based on the suspect record.

16. A device comprising:
a hosts database configured to store authentication records, wherein each authentication record is based on telemetry data from a plurality of intrusion sensors and comprises a thumbprint of a public key certificate and a host identifier of a sender computer;

a processor connected to the hosts database and programmed to:

receive telemetry data from a plurality of intrusion sensors;

receive a suspect record sent by a first intrusion sensor and comprising a first particular thumbprint of a first particular public key certificate and a first particular host identifier of a suspect sender computer;

determine whether the hosts database contains a matching record having a same host identifier as the first particular host identifier of the suspect record and a same thumbprint as the first particular thumbprint of the suspect record;

instruct a second intrusion sensor to request a second particular public key certificate from the suspect sender computer of the suspect record;

generate an intrusion alert when no matching record is found.

17. The device of claim 16 wherein the plurality of intrusion sensors comprises two intrusion sensors that are assigned internet protocol (IP) addresses that differ by at least one of: routing prefix, network prefix, and subnet number.

18. A plurality of non-transitory computer-readable storage media storing instructions which, when executed by a plurality of processors, cause:

receiving telemetry data from a plurality of intrusion sensors;

storing authentication records in a hosts database, wherein each authentication record is based on the telemetry data and comprises a thumbprint of a public key certificate and a host identifier of a sender computer;

receiving a suspect record that was sent by a first intrusion sensor and comprising a first particular thumbprint of a first particular public key certificate and a first particular host identifier of a suspect sender computer;

determining whether the hosts database contains a matching record having a same host identifier as the first particular host identifier of the suspect record and a same thumbprint as the first particular thumbprint of the suspect record;

instructing a second intrusion sensor to request a second particular public key certificate from the suspect sender computer of the suspect record;

generating an intrusion alert when no matching record is found.

19. The computer-readable storage media of claim 18 wherein the plurality of intrusion sensors comprises two intrusion sensors that are assigned internet protocol (IP) addresses that differ by at least one of: routing prefix, network prefix, and subnet number.

* * * * *